(12) United States Patent
Dean et al.

(10) Patent No.: US 7,752,138 B1
(45) Date of Patent: Jul. 6, 2010

(54) DYNAMIC LICENSING IN A DISTRIBUTED SYSTEM

(75) Inventors: Loren Dean, Natick, MA (US); Matt Shawver, Brighton, MA (US); Eric Raffi, Ashland, MA (US); Roy Lurie, Hopkinton, MA (US)

(73) Assignee: The Mathworks, Inc., Natick, MA (US)

( * ) Notice: Subject to any disclaimer, the term of this patent is extended or adjusted under 35 U.S.C. 154(b) by 1169 days.

(21) Appl. No.: 10/896,671

(22) Filed: Jul. 21, 2004

(51) Int. Cl.
*G06Q 99/00* (2006.01)

(52) U.S. Cl. ............... 705/59; 705/50; 705/51; 705/57; 705/64; 726/26

(58) Field of Classification Search ......... 705/50–59, 705/7–12; 726/26
See application file for complete search history.

(56) References Cited

U.S. PATENT DOCUMENTS

| | | | |
|---|---|---|---|
| 5,671,412 A * | 9/1997 | Christiano | 707/104.1 |
| 6,789,189 B2 * | 9/2004 | Wheeler et al. | 713/156 |
| 7,343,297 B2 * | 3/2008 | Bergler et al. | 705/1 |
| 7,389,916 B2 * | 6/2008 | Chirnomas | 235/381 |
| 7,395,536 B2 * | 7/2008 | Verbeke et al. | 718/100 |
| 2002/0046181 A1 * | 4/2002 | Story et al. | 705/59 |
| 2002/0164025 A1 * | 11/2002 | Raiz et al. | 380/231 |
| 2003/0088517 A1 * | 5/2003 | Medoff | 705/59 |
| 2004/0003269 A1 * | 1/2004 | Waxman et al. | 713/193 |

OTHER PUBLICATIONS

Husbands, Parry Jones Reginald, "Interactive Supercomputing," pp. 1-96 (1999).

* cited by examiner

*Primary Examiner*—Jalatee Worjloh
(74) *Attorney, Agent, or Firm*—Harrity & Harrity, LLP

(57) ABSTRACT

A method and system is disclosed for dynamic licensing of software products in a distributed system. A job is generated by a master (or client) and the tasks in the job are distributed to a cluster of workers for the distributed execution of the job. The tasks are distributed with information on the software products for which the master is licensed. The workers receive the tasks with the information on the software products for which the master is licensed. The workers dynamically provide licenses for the software products which the master is licensed for. The workers execute the tasks using the dynamically provided licenses for the software products. The results from the execution of the tasks are returned to the client.

32 Claims, 5 Drawing Sheets

DYNAMIC LICENSING IN A DISTRIBUTED SYSTEM

FIELD OF THE INVENTION

The present invention relates generally to a distributed system and more particularly to methods and systems for dynamically providing licenses for software products in the distributed system.

BACKGROUND OF THE INVENTION

In order for software products, such as operating systems and applications, to run in users' hardware machines, the users may need licenses for the software products. When the software products use a function provided in different software products, the users may need separate licenses for the different software products. For example, an application generated in MATLAB®, from The MathWorks, Inc. of Natick, Mass., which provides a technical computing environment, may call functions provided in Toolboxes to obtain a desired result of the application. In this case, the users may need separate licenses for particular Toolboxes although the users have a license for MATLAB®.

A distributed system may include a master machine and a cluster of remote machines to execute applications in parallel, which reduces the execution time of the applications. In the distributed system, the remote machines may need the same licenses for software products as the master for the distributed execution of the applications. For example, users may simulate an aircraft model with different parameters, such as 100 different altitudes and 50 different aircraft weights. This means that the aircraft model needs to be simulated 5,000 times with slightly different altitudes and aircraft weights. In order to simulate the aircraft model in the distributed system, 5,000 remote machines may need the same licenses for software products that are required for the simulation of the aircraft model. This is very cost-prohibitive for the users and is a wasteful use of the license. Therefore, it is desired to provide a new and efficient licensing scheme for the distributed system.

SUMMARY OF THE INVENTION

The present invention provides a method and system for enabling licenses for software components in a distributed system. A plurality of tasks may be generated by a master (or client). The tasks are distributed to a cluster of workers for the distributed execution of the tasks. The tasks may be distributed with information on the software components for which the master is licensed. The workers may receive the tasks with the information on the software components for which the master is licensed. The workers dynamically provide licenses for the software components based on the received information. The workers execute the tasks using the dynamically provided licenses for the software components. The results from the execution of the tasks may be returned to the client.

In accordance with one aspect of the present invention, a job including a plurality of tasks is generated in a first device, wherein at least one software component is needed to execute the tasks. Information on software components which the first device is licensed for is provided. The tasks are sent out with the information.

In another aspect of the present invention, a task is received with information on software components which a first device is licensed for, wherein the task is created in the first device. Licenses are dynamically provided for the software components based on the information. The task is executed using the licenses for the needed software components.

In still another aspect of the present invention, a system includes a client for generating a job including a plurality of tasks. The system also includes a plurality of workers for executing the tasks. The client provides information on software component(s) for which the client is licensed. The workers receive the information and provide licenses for the software components based on the information.

In yet still another aspect of the present invention, a medium is provided that holds data and instructions executable in an electronic device. The medium holds a set of instructions for a job generated by a client, wherein the job includes a plurality of tasks executed in different remote electronic devices for a distributed execution of the job, wherein at least one software component is needed to execute the tasks. The medium also holds data for information on software components for which the client is licensed.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
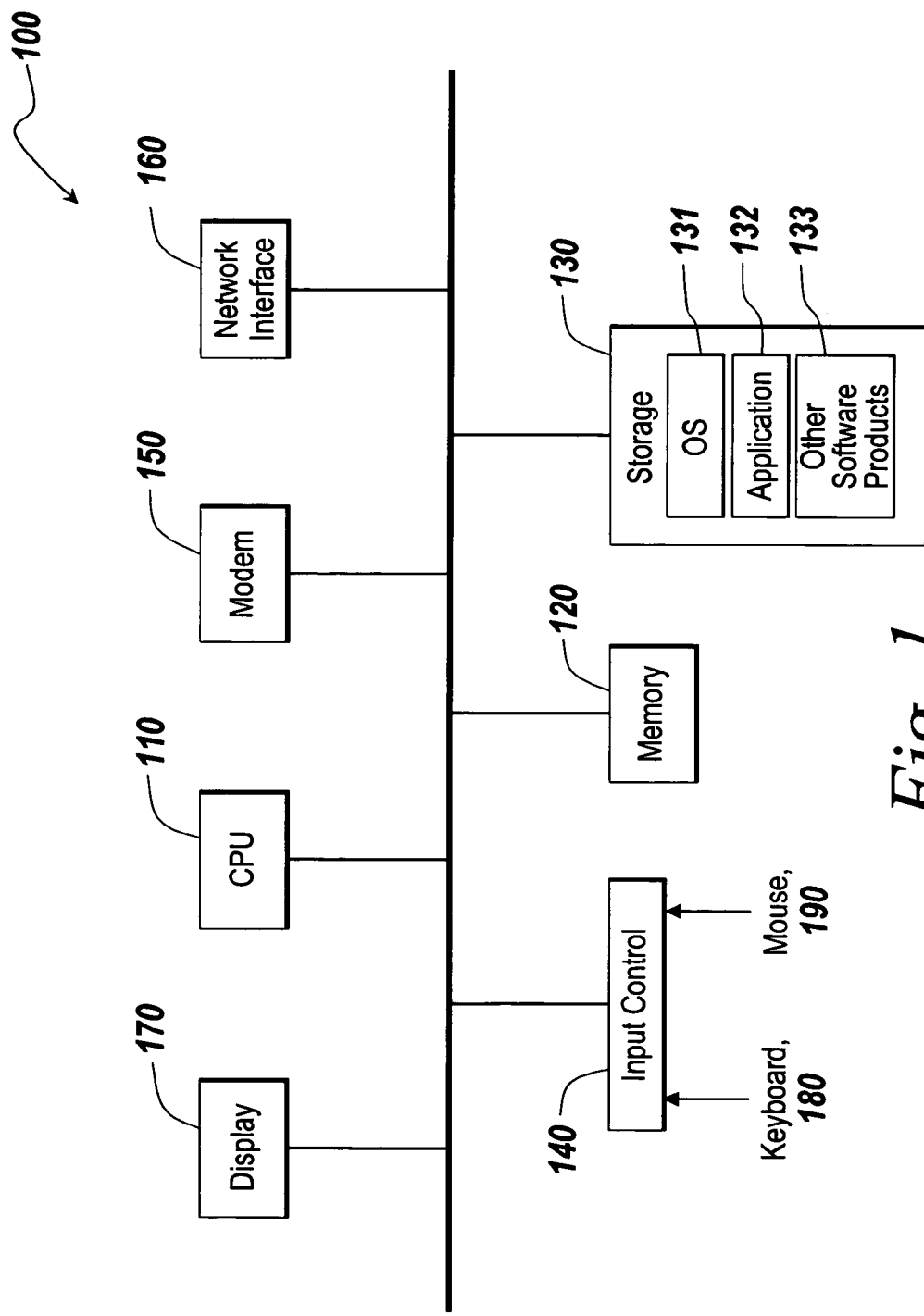
FIG. 1 is an exemplary electronic device suitable for practicing the illustrative embodiment of the present invention.

The illustrative embodiment of the present invention provides for dynamic licensing of software components or products in a distributed system including at least a master (or client). A job may be generated by the master (or client) and include one or more function calls provided in different software components or products. The job includes a plurality of tasks that are distributed to other workers for a distributed execution of the job. When the tasks are distributed to other workers, information on the software components or products for which the master (or client) is licensed is also distributed with the tasks. The workers receive the tasks with the information on the software components or products and dynamically provide licenses for the software components or products based on the information. The workers execute the tasks using the dynamically provided licenses for the software components or products. The results from the execution of the tasks are returned to the client. The illustrative embodiment will be described below in connection with software products for only illustrative purposes. One of ordinary skill in the art will appreciate that the present invention may also apply to software components as well as software products.

In the illustrative embodiment, the job is created and executed in a computing environment, such as MATLAB® environment. For the description of the illustrative embodiment of the present invention, a couple of terms are referred to as follows.

A task refers to a unit of work that includes at least a MATLAB® operation producing output signals (or data) in response to input signals (or data).

A job refers to collections of tasks. The job is an illustrative object for referring to the collections of tasks and tasks may be contained in an object other than a job.

A Master (or Client) refers to a MATLAB® session or a machine where the MATLAB® session is running for creating a job including a plurality of tasks.

A Worker refers to a remote MATLAB® session or a remote machine where the remote MATLAB® session is running for receiving and executing a task and returning a result from the execution of the task.

If a Client creates a job including a plurality of tasks, the tasks are distributed to Workers with a list of software products for which the Client is licensed. The Workers receive the tasks with the list of software products and dynamically provide licenses for the software products in the list. The Workers execute the function specified by the task and produce results using the dynamically generated licenses for the software products. The results are then made available for retrieval by the Client.

The illustrative embodiment will be described solely for illustrative purposes relative to a MATLAB® environment. Although the illustrative embodiment will be described relative to MATLAB®-based applications and products, one of ordinary skill in the art will appreciate that the present invention may be applied to license software products generated in different programming and/or execution environments, such as LabVIEW® from National Instruments, Inc.

MATLAB® is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN. MATLAB® provides comprehensive collections of MATLAB® functions in Toolboxes. The Toolboxes support applications involving signal and image processing, control system design, optimization, financial engineering, symbolic math, neural networks, and others. The Toolboxes may be built with M-files, MEX files, Java files and other languages.

The illustrative embodiment may also be applied to a block diagram modeling environment, such as time-based block diagrams, state-based and flow diagrams, and data-flow diagrams. An exemplary block diagram modeling environment could be found in Simulink®, from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagram models of the target systems. Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor, such as the textual interface provided in MATLAB®. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model. Simulink® Blocksets provide application specific blocks that support the design of models. The Blocksets provide utilities for the development and integration of models for systems and sub-systems of the systems. The Blocksets may include Aerospace Blockset, Signal Processing Blockset, etc.

FIG. 1 is an exemplary electronic device 100 suitable for practicing the illustrative embodiment of the present invention, which may provide a computing environment, such as a MATLAB® environment. One of ordinary skill in the art will appreciate that the electronic device 100 is intended to be illustrative and not limiting of the present invention. The electronic device 100 may take many forms, including but not limited to a workstation, server, network computer, Internet appliance, mobile device, a pager, a tablet computer, and the like. One of ordinary skill in the art will also appreciate that the electronic device 110 may be used for Clients and Workers.

The electronic device 100 may include a Central Processing Unit (CPU) 110, a memory device 120, storage medium 130, an input control 140, a network interface 160, a MODEM 150, a display 170, etc. The input control 140 may interface with a keyboard 180, a mouse 190, and other input devices. The electronic device 100 may receive through the input control 140 input data necessary for creating a job (tasks) in the computing environment. The network interface 160 and the MODEM 150 enable a Client to communicate with Workers through communication networks, such as Internet, intranet, LAN (Local Area Network), WAN (Wide Area Network) and MAN (Metropolitan Area Network). The communication facilities support for the distributed execution of the job.

The CPU 110 controls each component of the electronic device 100 to provide the computing environment. The memory 120 fetches from the storage 130 and provides to the CPU 110 code that needs to be accessed by the CPU 110 to operate the electronic device 100 and to run the computing environment. The storage 130 usually contains software tools for applications. The storage 130 includes, in particular, code 131 for the operating system (OS) of the device 100, code 132 for applications running on the operation system, such as applications for providing the computing environment, and other software products 133, such as Toolboxes, licensed for using in the device 100.

One of ordinary skill in the art will appreciate that the Clients and Workers do not need to be the same electronic device. For example, the Clients and Workers may include different operating systems or different CPUs.

Figure 2:
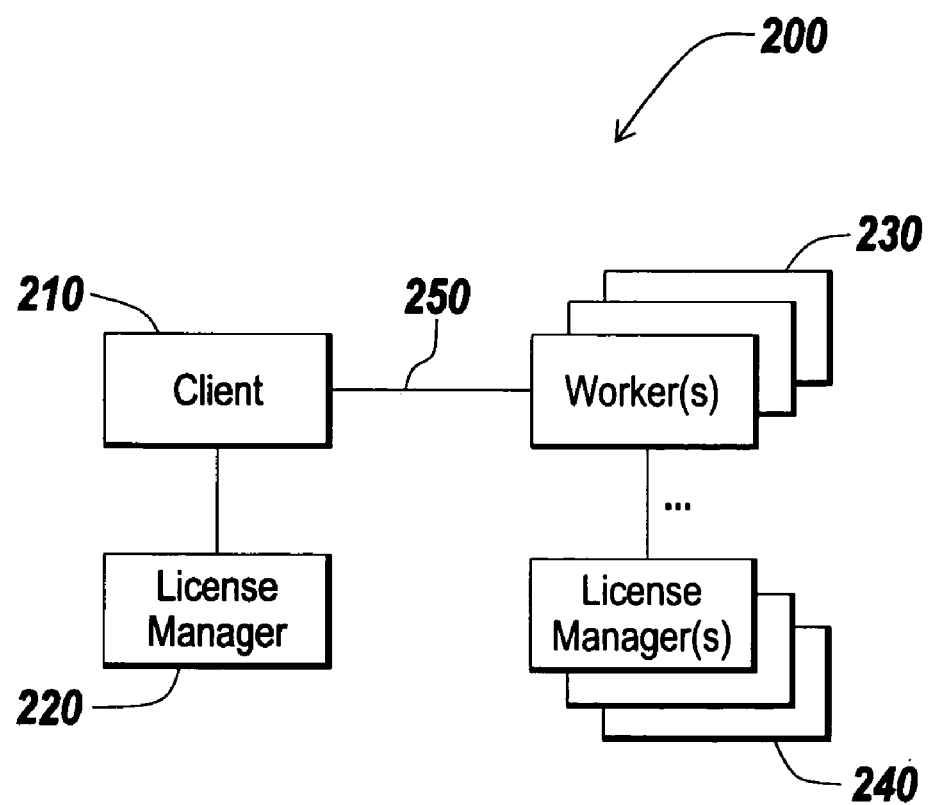
FIG. 2 is an exemplary configuration of a distributed system in the illustrative embodiment.

FIG. 2 is an exemplary configuration of a distributed system 200 in the illustrative embodiment of the present invention. The distributed system 200 includes a Client 210 and a cluster of Workers 230. One of ordinary skill in the art will appreciate that the single Client 210 is only for illustrative purposes and there could be multiple Clients interacting with different Workers simultaneously. One of ordinary skill in the art will also appreciate that the plurality of Workers 230 are for illustrative purposes and there could be a single Worker interacting with the Client or Clients. The Client 210 and Workers 230 communicate with each other through a communication network 250. The Workers may or may not communicate with each other depending on the topology of the distributed system 200. The Workers 230 may communicate with other Workers 230 in a general virtual topology where the Workers 230 include interfaces to interact with other Workers 230. On the other hand, the Workers 230 may not communicate with other Workers in an embarrassingly parallel virtual topology. An example of the embarrassingly parallel virtual topology is described below in more detail with reference to FIG. 5, where the Workers communicate with an intermediary agent.

The Client 210 is coupled to its license manager 220 that provides licenses for the software products running in the Client. The license manager 220 may reside in the Client or in a remote machine. One of ordinary skill in the art will appreciate that the single license manager 220 is only for illustrative purposes and the Client 210 could be coupled to more than one license manager. The Workers 230 are also coupled to their license manager(s) 240 that provide licenses for the software products running in the Workers. The Workers 230 may communicate with a single license manager or multiple license managers. The license manager(s) 240 may reside in the Workers or in remote machines. One of ordinary skill in the art will appreciate that the Client 210 and Workers 230 may share the same license manager. The license managers 220 and 240 may be implemented using commercially available products, such as FLEXlM™ from Macrovision Corp. of Santa Clara, Calif. The license managers 220 and 240 may involve a server-client relationship that requires the Client 210 and Workers 230 to first successfully check out a license from the license managers 220 and 240 in order for software products to be used on the Client and Workers.

In the illustrative embodiment of the present invention, the Client is a MATLAB® session that creates a job including a plurality tasks and the Workers are remote MATLAB® sessions that execute the tasks. When MATLAB® is installed for a single user, a passcode is required to inform the MATLAB® installer of which software products users are licensed for. On Windows, the MATLAB® installer generates a license file which includes information on which software products the users are licensed for. For other installs, the license file may be provided from the MATLAB® provider. The license file is read by the license manager 220. The users then start MATLAB® and a MATLAB® license is made available. If the MATLAB® license is available, then a license is authorized or validated against the license file by the license manager 220 and checked out until the end of the MATLAB® session. The license check-outs may include other options. For example, the license is checked out until the user manually/explicitly returns the license, or the license times out for the given session.

As the MATLAB® session proceeds, an application may call a function provided in different software products, such as Toolboxes or Blocksets, to be executed. In a normal license checking procedure, the MATLAB® checks whether the users are licensed to use those software products, and if the users licensed for the software products, then the application will continue to execute. Additionally, a license for the software product is provided by a license manager and checked out until MATLAB® shuts down, the user manually/explicitly returns the license, or the license times out for the given MATLAB® session. For the creation and execution of a job in the distributed system 200, the illustrative embodiment of the present invention provides a dynamic licensing of the software products, as opposed to the normal license checking procedure, which will be described below in more detail with reference to FIGS. 3 and 4.

Figure 3:
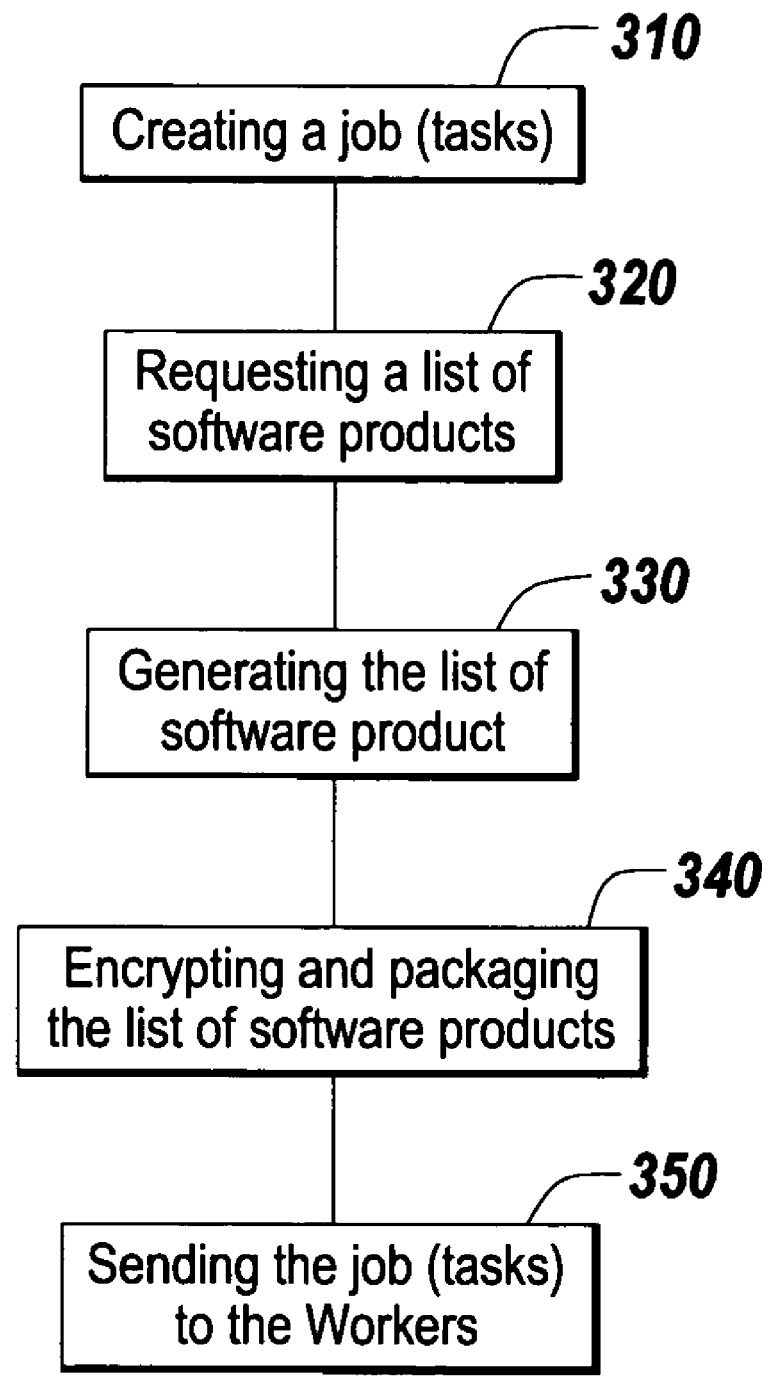
FIG. 3 is a flow chart showing an exemplary operation of a Client for generating a job in the illustrative embodiment.

FIG. 3 is a flow chart showing an exemplary operation of a Client for generating a job in the illustrative embodiment. The Client 210 may generate a job that includes a plurality of tasks (step 310). In the illustrative embodiment, a task is a MATLAB® operation containing a reference to a MATLAB® function. Nevertheless, those skilled in the art will appreciate that in other instances a task may more generally be as defined above. If a job is generated, the Client 210 requests the license manager 220 to generates a list of software products for which the Client 210 is licensed (step 320). In response to the request, the license manager 220 returns a list of software products that the Client 210 is licensed for (step 330). The list of software products for which the Client 210 is licensed is encrypted and then packaged with the tasks (step 340). The Client 210 sends the Workers 230 the tasks with the encrypted list (step 350).

Figure 4:
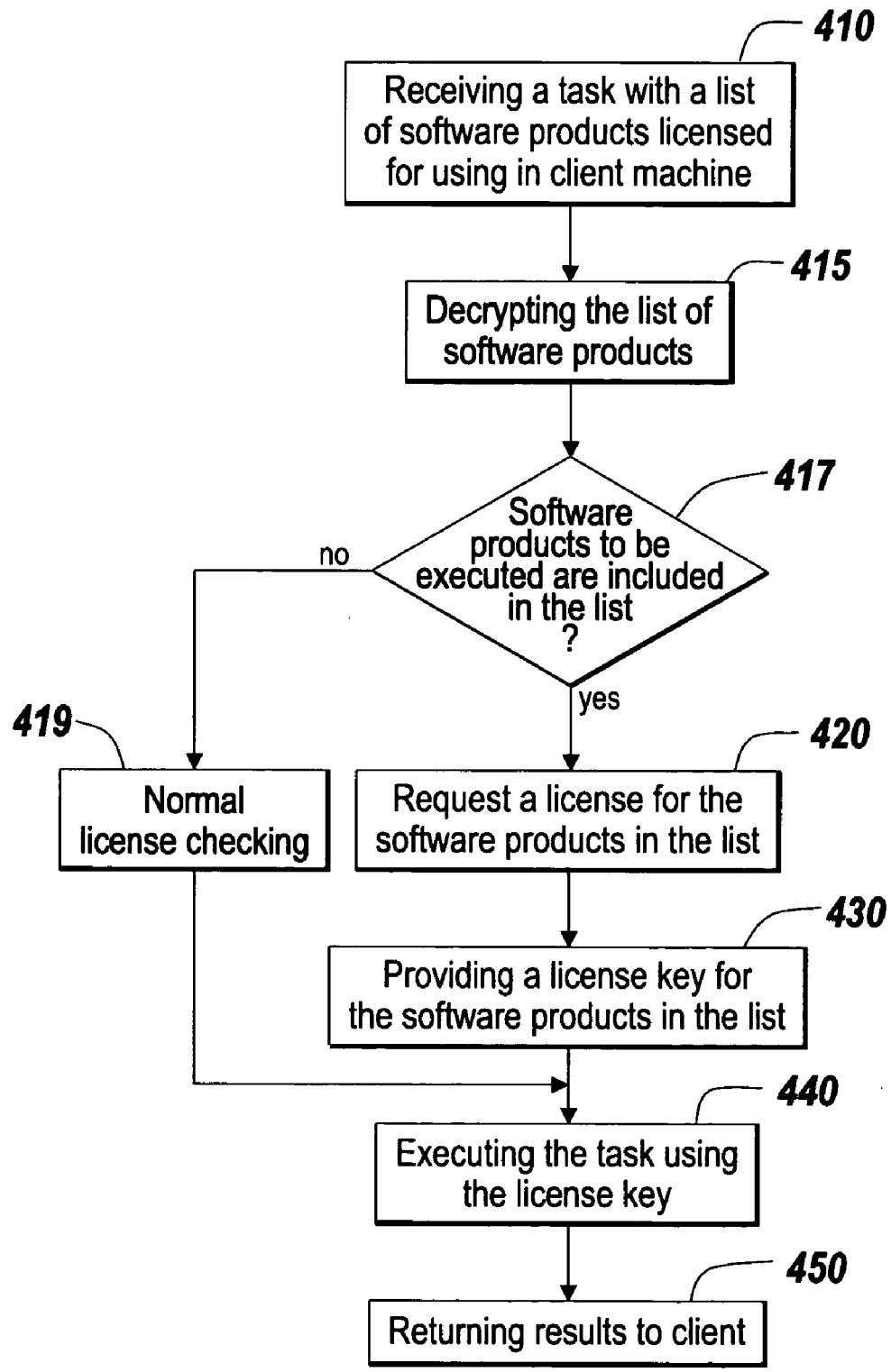
FIG. 4 is a flow chart showing an exemplary operation of Workers for executing tasks in the illustrative embodiment.

FIG. 4 is a flow chart showing an exemplary operation of Workers 230 for executing the tasks in the illustrative embodiment. The Workers 230 may receive tasks with encrypted information on software products that the Client 210 is licensed for (step 410). After receiving the tasks, the Workers 230 decrypt the information and determine which software products the Client 210 is licensed for (step 415). The decrypted information may include a list of software products for which the Client 210 is licensed. On starting a MATLAB® worker session to execute the tasks, the Workers 230 determines whether software products required for executing the tasks are included in the list received from the Client 210 (step 417). If the software products are not included in the list (step 417), the Workers 230 perform a normal license checking to determine whether the software products are licensed for use in the Workers 230 (step 419). The normal Toolbox or Blockset license checking procedure is described above with reference to FIG. 2. If the software products are licensed for use in the Workers 230, the tasks are executed using the licensed software products (step 440). If the software products are not licensed to use in the Workers 230, the tasks cannot be executed in the Workers 230. If the software products are included in the list (step 417), the Workers 230 request the license manager(s) 240 to provide Worker licenses for the software products for which the Client 210 is licensed (step 420). In another embodiment, each of the Workers 230 may have individual licenses for the software products with its own license manager. In response to the request, the license manager(s) 240 provides a Worker license for the software products for which the Client 210 is licensed based on the decrypted list (step 430). The MATLAB® checks out the Worker license and disables a normal Toolbox or Blockset license checking procedure described above with reference to step 419. When the Worker license is checked out, appropriate Toolboxes and other software products are enabled when the Workers 230 receive the tasks and the Workers 230 execute the tasks using the enabled software products (step 440). In some instances, only the basic MATLAB product may be needed to execute the task in the Workers 230. In this case, the MATLAB product in the Workers may be mapped to the MATLAB licensed for use in the Client. After the tasks are executed in the Workers, the results from the execution of the tasks are returned to the Client 210 (step 450). The previously enabled licenses are disabled.

In the general virtual topology where the Workers 230 communicate with other Workers 230, which is described above with reference to FIG. 2, a result from the execution of a task can be forwarded to another Worker for a series execution of tasks through a series of Workers. The series of workers may execute a series of tasks based on the execution result of a previous task in the sequence of the tasks. The last Worker in the series of the Workers may return the execution result of its task to the Client 210.

Figure 5:
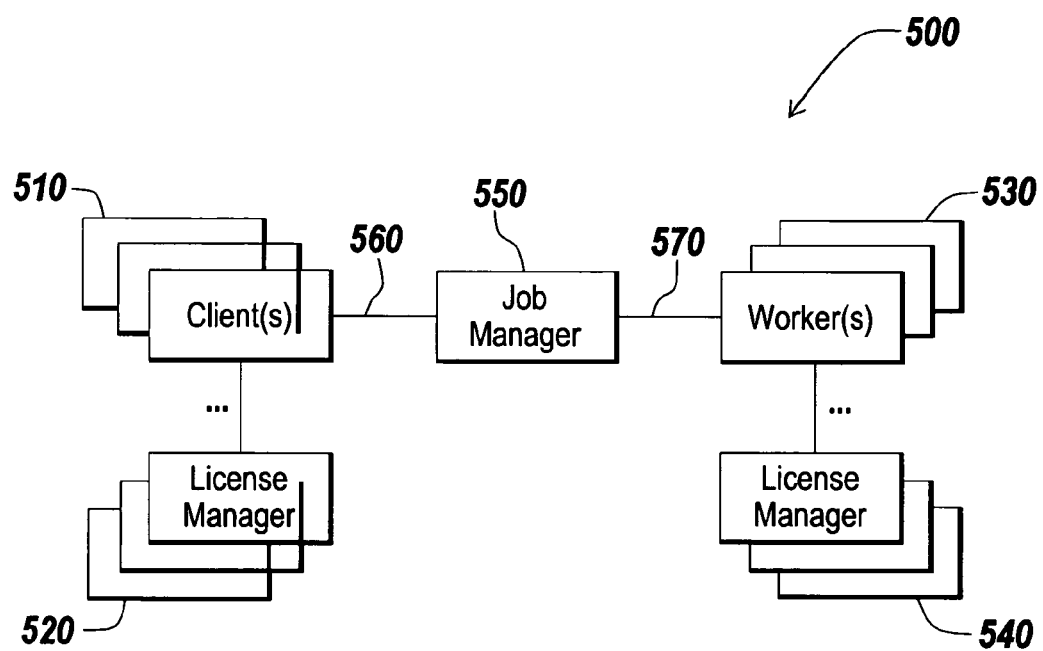
FIG. 5 depicts another exemplary configuration of a distributed system in the illustrative embodiment.

FIG. 5 is another exemplary configuration of a distributed system 500 in the illustrative embodiment of the present invention. The distributed system 500 includes a plurality of Clients 510 and a plurality of Workers 530. One of ordinary skill in the art will also appreciate that the plurality of Clients 510 and Workers 530 are for illustrative purposes and there could be a single Client or Worker interacting with the Worker(s) or Client(s). The Clients 510 and Workers 230 communicate with a job manager 550 through communication networks 560 and 570. One of ordinary skill in the art will appreciate that the communication networks 560 and 570 may be the same or different communication networks. Under this configuration, tasks are created and grouped into a job by the Clients 510 and submitted to the job manager 550 for processing of the job. The job manager 550 handles the job, for example, in a FIFO manner, not starting to process the next job until there are no tasks remaining from the previous job. The Clients 510 are coupled to the license manager(s) 520 that provide licenses for the software products running in the Clients. The Workers 530 may also be coupled to the license manager(s) 540 that provide licenses for the software products running in the Workers.

In one of the Clients 510, users may generate a job that includes a plurality of tasks. If a job is generated by a Client 510, the Client 510 requests its license manager 520 to generate a list of software products for which the Client 510 is licensed. In response to the request, its license manager 520 returns a list of software products that the Client 510 is licensed for. The list of software products for which the Client 510 is licensed is encrypted and then packaged with the job. The Client 510 sends the job manager 550 the job with the encrypted list of the software products that the Client 510 is licensed for.

The job manager 550 receives the job from the Client 510 with the list of software products the Client 510 is licensed for. If any Workers 530 are available, the job manager 550 starts handling the tasks included in the received job with the list of software products for which the Client 510 is licensed. For instance, if a job includes 50 tasks and 78 machines are available from a cluster of 128 machines, the next job in the queue starts to continue.

The Workers 530 receive the tasks with the list of software products that the Client 510 is licensed for. The Workers 530 request their license managers 540 to provide Worker licenses for the software products for which the Client 510 is licensed. In response to the request, the license manager(s) 540 provide a license for the software products based on the received list. The Workers 530 check out the Worker license and bypass a normal license checking procedure. When the Worker license is checked out, appropriate Toolboxes and other software products are enabled and the Workers 530 execute the tasks using the enabled software products. After the tasks are executed in the Workers, the results from the execution of the tasks are returned to the job manager 550 and the Worker MATLAB® may be shut down. Upon shutdown, the worker MATLAB® key is returned. In a general virtual topology where the Workers communicate with other Workers, the result from the execution of a task can be forwarded to another Worker for a series execution of tasks through a series of Workers. The series of workers may execute a series of tasks based on the execution result of a previous task in the sequence of the tasks. The last Worker in the series of the Workers may return the execution result of its task to the job manager. Finally, the job manager 550 forwards the results to the Client 510 in response to a request from the Client 510.

In summary, the illustrative embodiment of the present invention provides a dynamic licensing for software products for a distributed process of tasks. A Master (or Client) generates a plurality of tasks. The Master also provides information on software products that the Master is licensed for. The tasks are distributed to Workers with the information on software products that the Master is licensed for. The workers receive the tasks with the information on software products that the Master is licensed for. Worker licenses are dynamically checked out for the execution of the tasks. The worker license is checked out only for the distributed execution of the tasks, and expires upon the execution of the tasks. After the tasks are executed, the results from the execution of the tasks are returned to the Master.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any distributed system that executes tasks in remote machines. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method in a distributed system that includes a client device and one or more worker devices, the method comprising:

generating a plurality of tasks via the client device, where each of the plurality of tasks includes an operation to produce output data in response to input data, where at least one software component is needed to execute the tasks;

determining, via the client device, information about software components for which the client device is licensed, including:

requesting licensing data about the software components for which the client device is licensed, and dynamically generating, in response to requesting the licensing data, the information about the software components for which the client device is licensed;

sending, from the client device, the plurality of tasks with the determined information to the one or more worker devices, including encrypting the information, and packaging the encrypted information with the plurality of tasks;

dynamically generating, via the one or more worker devices and based on the determined information, licenses for the at least one software component needed to execute the plurality of tasks; and executing, via the one or more worker devices, the plurality of tasks using the dynamically generated licenses for the at least one software component.

2. The method of claim 1, where the information includes a list of software components for which the client device is licensed.

3. The method of claim 1, where the plurality of tasks are distributed to the one or more worker devices for distributed execution of the plurality of tasks.

4. The method of claim 1, where the client device provides a technical computing environment.

5. The method of claim 4, where the plurality of tasks include at least one technical computing function.

6. A method in a distributed system that includes a client device and at least one worker device, the method comprising:
receiving, from the client device and by the at least one worker device, a task and information about software components for which the client device is licensed, where the task includes an operation to produce output data in response to input data, where the client device is configured to:
request information about licenses, of the client device, for the software components, where the information, about the software components for which the client device is licensed, is generated, in response to the request,
encrypt the information, and
package the encrypted information with the task;
determining, via the at least one worker device, a subset to be enabled for execution based on the information, where the subset includes one or more of the software components, the subset being needed to execute the task by the at least one worker device; and
dynamically enabling for execution, via the at least one worker device, the subset, where dynamically enabling the subset includes generating a license for each of the one or more of the software components in the subset.

7. The method of claim 6, further comprising:
executing the subset to complete the task.

8. The method of claim 6, further comprising:
preventing execution of the software components that are not included in the subset.

9. The method of claim 6, where the receiving comprises:
receiving the task directly from the client device.

10. The method of claim 6, where the receiving comprises:
receiving the task from an intermediary manager.

11. The method of claim 6, where the receiving comprises:
downloading the task through communication networks.

12. The method of claim 6, further comprising:
decrypting the information; and
determining the subset based on the decrypted information.

13. The method of claim 6, where the determining comprises:
checking the information for a license for a particular software component;
determining whether the license is issued for distributed execution of the task; and
bypassing a procedure for checking licenses for the particular software component when the license is issued for distributed execution of the task.

14. A system comprising:
a client configured to:
create a plurality of tasks, where each of the plurality of tasks includes an operation to produce output data in response to input data, and
generate a request for information about software components for which the client is licensed; and
a license manager configured to:
receive the request from the client,
dynamically generate, in response to the request, the information about licensing of the software components by the client, and
provide the information about the software components for which the client is licensed in response to the received request,
where the client is further configured to:
encrypt the information,
package the encrypted information with the plurality of tasks, and
provide the packaged information and the plurality of tasks to one or more worker devices for a distributed execution of the plurality of tasks, where the distributed execution of the plurality of tasks includes:
the one or more worker devices dynamically licensing selected software components, the selected software components being needed for the distributed execution of the plurality of tasks, and
the one or more worker devices performing the plurality of tasks using the licensed, selected software components.

15. The system of claim 14, where the client is configured further to:
package the information with the plurality of tasks in a job, and
provide the job to the one or more worker devices for the distributed execution of the plurality of tasks.

16. The system of claim 14, where the information includes a list of software components for which the client is licensed.

17. The system of claim 14, further comprising:
an intermediary manager configured to:
receive the packaged information and the plurality of tasks from the client, and
distribute the plurality of tasks to the one or more worker devices.

18. The system of claim 17, where the intermediary manager is further configured to:
receive results of execution of the plurality of tasks from the one or more worker devices, and
forward the results to the client.

19. A system comprising:
a client device configured to:
request information about licensing of software components by the client device, where the information, about the software components for which the client device is licensed, is dynamically generated in response to the request,
encrypt the information, and
package, in a message, the encrypted information with a task;
a worker device configured to receive the message related to the task, created by the client, where the message includes the information about the software components for which the client is licensed, and where the task includes an operation to produce output data in response to input data; and
a license manager configured to provide licenses for the software components based on the information,
where the worker device is further configured to:
receive the licenses from the license manager, and
execute the task based on the received licenses.

20. The system of claim 19, where the worker device is further configured to bypass a procedure for checking licenses for the software components, where the license checking procedure includes the worker device receiving licenses for software components for which the worker device is licensed.

21. The system of claim 19, where the worker device is further configured to decrypt the information to determine a list of software components for which the client is licensed.

22. The system of claim 19, further comprising:
an intermediary manager configured to:
receive the task from the client, and
distribute the task to the worker device.

23. The system of claim 22, where the intermediary manager is further configured to:
receive results of execution of the task from the worker device, and
forward the results to the client when requested by the client.

24. One or more media storing instructions executable in an electronic device, the one or more media comprising:
one or more instructions to receive a plurality of tasks generated by a client, where each of the plurality of tasks includes an operation to produce output data in response to input data, where the plurality of tasks are executed in worker devices in a distributed manner and at least one software component is needed to execute the plurality of tasks, where the client requests information about licensing by the electronic device of the software components, where the information, about the software components for which the electronic device is licensed, is generated in response to the request,
one or more instructions to store data associated with information about software components for which the client is licensed; and
one or more instructions to provide the information to the worker devices based on the received plurality of tasks, including
one or more instructions to encrypt the information, and
one or more instructions to package the encrypted information with one or more of the plurality of tasks.

25. One or more media storing instructions executable in an electronic device, the one or more media comprising:
one or more instructions to generate a plurality of tasks in the electronic device, where each of the plurality of tasks includes an operation to produce output data in response to input data, and where at least one software component is needed to execute the plurality of tasks;
one or more instructions to determine information about software components for which the electronic device is licensed, including one or more instructions to request information about licensing of the software components for which the electronic device, where the information, about the software components for which the electronic device is licensed, is generated in response to the request; and
one or more instructions to send the plurality of the tasks with the determined information to one or more worker devices, including
one or more instructions to encrypt the information, and
one or more instructions to package the encrypted information with the plurality of tasks.

26. The one or more media of claim 25, where the one or more instructions to determine information comprise:
one or more instructions to request information about the software components for which the electronic device is licensed; and
one or more instructions to dynamically generate, in response to the request, the information about the software components for which the electronic device is licensed.

27. The one or more media of claim 25, where the information includes a list of software components for which the electronic device is licensed.

28. The one or more media of claim 25, where the plurality of tasks are distributed to the one or more worker devices for distributed execution of the plurality of tasks.

29. One or more media storing instructions executable in an electronic device, the one or more media comprising:
one or more instructions to receive a task and information about software components for which a client device is licensed, where the task is created in the client device, and where the task includes an operation to produce output data in response to input data, where the information is automatically generated in response to a request, from the client device, for the information, where the information is encrypted, and where the encrypted information is packaged with the task;
one or more instructions to dynamically provide licenses for the software components based on the received information; and
one or more instructions to execute the task using the licenses for the software components.

30. The one or more media of claim 29, where the one or more instructions to receive the task and the information comprise:
one or more instructions to decrypt the received information.

31. The one or more media of claim 30, where the one or more instructions to dynamically provide comprise:
one or more instructions to request the licenses for the software components; and
one or more instructions to dynamically generate, in response to the request, the licenses for the software components based on the received information.

32. The one or more media of claim 31, where the one or more instructions to execute the task comprise:
one or more instructions to check the information for a license for a particular software component;
one or more instructions to determine that the license is issued for distributed execution of the task; and
one or more instructions to bypass a procedure for checking licenses for the particular software component when the license is issued for distributed execution of the task.

* * * * *